United States Patent
Johnson, Jr.

[11] Patent Number: 5,262,597
[45] Date of Patent: Nov. 16, 1993

[54] SYSTEM AND A METHOD FOR PROCESSING INTERNATIONAL PRIORITY AIRMAIL

[75] Inventor: Jacob C. Johnson, Jr., Alpine, N.J.

[73] Assignee: Johnson & Hayward, Inc., New York, N.Y.

[21] Appl. No.: 883,535

[22] Filed: May 15, 1992

[51] Int. Cl.$^5$ .......................... G01G 9/00; G01G 19/52
[52] U.S. Cl. ........................................ 177/50; 177/1; 177/25.15; 364/464.01
[58] Field of Search ...................... 364/464.01, 464.02, 364/464.03; 177/25.15, 1, 50

[56] References Cited

U.S. PATENT DOCUMENTS

| | | | |
|---|---|---|---|
| 4,034,669 | 7/1977 | Freeman | 101/91 |
| 4,239,434 | 12/1980 | Gannon | 414/136 |
| 5,008,827 | 4/1991 | Sansone et al. | 364/464.02 |
| 5,119,306 | 6/1992 | Metelits et al. | 364/464.02 |

*Primary Examiner*—Benjamin R. Fuller
*Assistant Examiner*—Randy W. Gibson
*Attorney, Agent, or Firm*—Ohlandt, Greeley & Ruggiero

[57] ABSTRACT

There is provided a system for processing international priority airmail. The system includes a weigh in station for weighing the total weight of received priority airmail, a recordal station for recording the total number of pieces of the received airmail and for establishing criteria to identify the airmail in the system, an affixing station, located downstream of the weigh in and recordal stations, for affixing indicia onto the airmail; and a sorting station, located downstream of the affixing station, for sorting the airmail by country. The system also includes a processing unit that stores received information and processes the stored information to derive processed information, and a weighing and processing station, located downstream of the sorting station. The weighing and processing station is operatively connected to the processing unit, and in conjunction with the processing unit establishes a control weight per piece per country for identical pieces of airmail to be sent to each country and determines the total number of pieces per country. The system further provides for the generating of a report based on the information processed by the processing unit.

19 Claims, 8 Drawing Sheets

PRINT CLOSING REPORTS

SORT COUNTRY DATA BY ZONE
↓
PRINT COUNTRY LINES UNTIL EOF
MARK LINES THAT DO NOT QUALIFY
COMPUTE TOTALS BY ZONE
↓
PRINT POSTAGE BREAKDOWN
↓
EXIT

FIG.6

PRINT BILL

→ SELECT JOB NUMBER
↓
EXIT KEY ?
NO ↙         ↘ YES
SORT JOB DATA BY ZONE ←
↓
PRINT JOB DATA UNIT EOF
COMPUTE TOTAL WEIGHT & TOTAL PIECES

CALCULATE POSTAGE AMOUNTS
ZONE-PRICE   ZONE-TOTAL-WEIGHT + TOTAL-PIECES   ZONE-PIECE-PRICE
↓
EXIT

SYSTEM AND A METHOD FOR PROCESSING INTERNATIONAL PRIORITY AIRMAIL

BACKGROUND OF THE INVENTION

1. Field of the Invention

The present invention relates to a system and a method for processing mail. More particularly, it relates to a system and a method for processing international priority airmail (IPA) to meet the criteria and to obtain the preferred postage rates set forth by the United States Postal Service.

The United States Postal Service has, for some period of time, provided postage rate discounts for mailing large quantities and/or weight of letters, packages and the like to international locations. Particularly, the United States Postal Service provides preferred postage rates for mailing of nonpresorted and presorted international priority airmail sent to all countries of the world, except Canada. The previous international priority airmail (IPA) postage rate structure provided a flat per-pound rate for nonpresorted and presorted mail.

Recently, the United States Postal Service regulations have been dramatically changed concerning the postage discounts provided for international priority airmail. While the new United States Postal regulations still provide a nonpresort rate option, they now provide for presorted mail a new international zone structure that has three rate groups. The rate in each of the three rate group has both a per piece and a per pound rate component.

Each rate group corresponds to a different one of the three international zones established by the United States Postal Service. In each zone, there is a large number of countries. The countries are not classified by geographical location, but instead are established passed on UPU terminal dues agreements with the United States. For example, group 1 includes many countries in the European market, such as Denmark, Finland, France, Germany, Great Britain, Italy, Netherlands, Norway and Sweden, yet it also includes Australia, but does not include Liechtenstein which is in group 2 and Switzerland which is in group 3.

The rates for the three rate groups for the presorted international priority airmail range from 20 cents per piece and $4.95 per pound to 15 cents per piece and $7.95 per pound. Specifically, group 1 now has a per piece rate of 20 cents and a per pound rate of $4.95, group 2 has a per piece rate of 15 cents and a per pound rate of $6.15 per pound, and group 3 has a per piece rate of 15 cents and a per pound rate of $7.95. The rates in all three rate groups compare favorably to the nonpresort rate of 20 cents per piece and $8.00 per pound. Also, the rate for nonpresort international priority airmail compares favorably to simply mailing individually pieces of international airmail.

To obtain even the nonpresort rate, the total international priority airmail mailing must be ten pounds or more, or 200 or more pieces. These requirements apply to the total mailing, not to each country.

To obtain the more favorable presort rate, the mail must be sorted by country and zone and, in addition, meet the following requirements. The mail in a zone must weigh ten pounds or more and there must be either more than six pieces of mail per country in that zone or a weight of ten pounds or more for mail directed to each country in that zone.

The ability to process a heavy volume of international priority airmail, such as letters, sent by a single entity, such as, for example, a corporation or a bank, in any given day provides significant problems That coupled with the necessity to comply with the United States Postal regulations in order to obtain the most advantageous postage rate, clearly creates even greater problems. Yet, the need to comply with the United States Postal regulations in order to obtain the most advantageous postage rate is readily apparent.

2. Description of the Prior Art

Prior to the present invention, it has been virtually impossible to both process mail and monitor it in order to comply with the above preferred presort postage rate requirements set forth by the United States Postal Service. Heretofore, one was required to have a large labor force to weigh virtually each letter or package and to individually sort each piece of mail and place the mail in the appropriate country bundle. Furthermore, detailed lists were manually compiled on a line by line basis for each piece of mail, and were manually compiled. To prepare such lists are extremely time consuming and expensive.

Also, there has not, heretofore, been a process that provides for simultaneous weighing and recordal of information that leads to the compiling of the desired report. Further, there has not, heretofore, been a system that readily provides for the detailed breakdown needed in order to allocate the postage costs to various cost centers, such as individual clients or divisions within an organization. Still further there has not, heretofore, been a process that provides within the process itself various check procedures to verify that the processed international priority airmail is correctly sorted and meets the requirements of the United States Postal Service.

Thus, the present system provides a comparatively economically efficient system for processing international priority airmail that segregates the mail within zones, and by country in each zone, and provides a detailed breakdown of the number of pieces of mail in each country in each zone and the weight of the mail in each country in each zone.

SUMMARY OF THE INVENTION

It is a primary object of the present invention to provide a system for the processing of international priority airmail.

It is another object of the present invention to provide such a system that separates the international priority airmail into the nonpresort and the presort rate categories established by the regulations of the United States Postal Service and provides detailed reports.

It is still another object of the present invention to provide such a system that provide such detailed reports that breakdown the international priority airmail into nonpresort and the international zones or three presort rate groups.

It is ye another object of the present invention to provide such a system that provides reports detailing in each presort rate group, each country therein, the number of pieces in each country, and the weight of the pieces in each country.

It is a further object of the present invention to provide such a system that reports when the minimum weight requirement to qualify for a presort rate group has not been met.

It is a still further object of the present invention to provide such a system that has verification checks to determine the accuracy of the system.

These and other objects are provided for by the present system for processing international priority airmail. The system comprises: a weigh in station for weighing in the total weight of the airmail and a recordal station for recording the total containers of airmail and for establishing identification criteria for the airmail in the system; an affixing station, located downstream of the weigh in and recordal stations, for affixing indicia onto the airmail; and a sorting station, located downstream of the affixing station, for sorting the airmail by country. The system also comprises a processing unit that includes means for storing received information and means for processing the stored information to derive processed information, and a weighing and processing station located downstream of the sorting station. The weighing and processing station is operatively connected to the processing unit, and in conjunction with the processing unit establishes a control weight per piece per country for identical pieces of mail to be sent to each country and determines the total number of pieces per country. The system further comprises means for generating a report based on the information processed by the processing unit, and a shipment or weigh out station for weighing the processed airmail for shipment. The system may include a receiving station for receiving the incoming airmail.

The method of the present invention for processing international priority airmail comprises: means for weighing in the total weight of the airmail; means for recording the total number of containers or pieces of the airmail and for establishing identification criteria for the airmail in the system; means, located downstream of the weigh in and recordal means, for affixing indicia onto the airmail; and means, located downstream of the affixing station, for sorting the mail by country. The method also includes means, located downstream of the sorting means, for combined weighing the airmail and recording the number of pieces. The combined weighing and recording means being operatively connected to a means for storing received information and for processing the stored information to derive processed information. The combined weighing and recording means in conjunction with the storing and processing means establish a control weight per piece per country for identical pieces of airmail to be sent to each country and determines the total number of pieces per country. The method further comprises means for generating a report based on the information processed by the storing and processing means, and means for weighing out the processed airmail.

The report includes a presort breakdown portion and a summary portion. The presort breakdown portion is separated into three sections each referencing a different international zone. Within each zone, there is included a country code, country name, number of units or pieces per country and the weight for the number of units per country. The summary portion includes a breakdown into four sections. One section is the summary for the nonpresort airmail. The three other sections are for the three international zones or presort rate groups. In each section, the number of units or pieces, the number of pounds and the mathematics of the price per piece and price per pound are provided, along with a summary of the total postage rate.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DETAILED DESCRIPTION OF THE PREFERRED EMBODIMENTS

Figure 1:
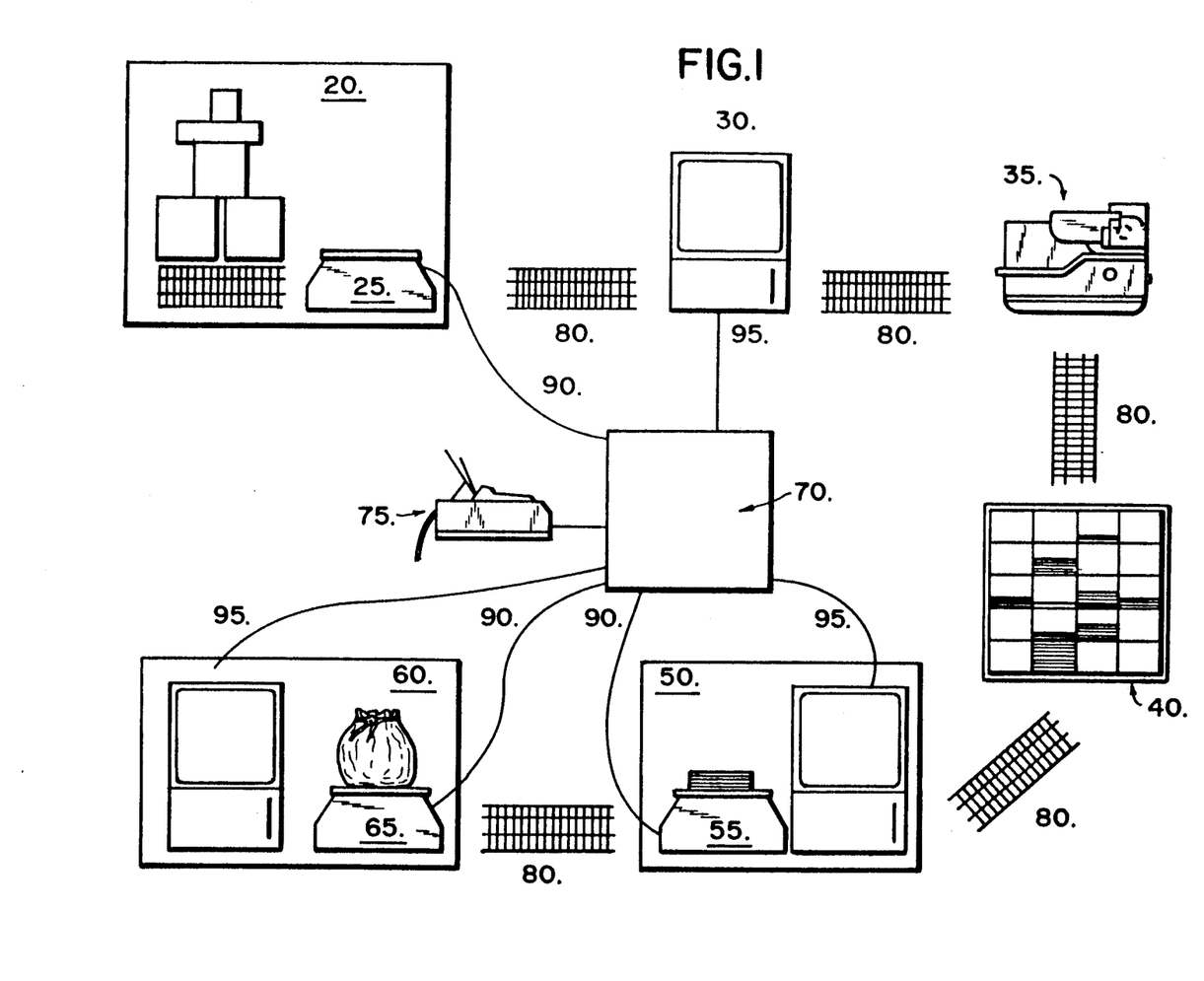
FIG. 1 is a block diagram of the system of the present invention.

Referring to the drawings and, in particular, FIG. 1, a system for processing international priority airmail according to the present invention is generally represented by reference numeral 10. The system 10 includes a number of stations. In particular, the system 10 includes: a weigh in station 20 for weighing the total weight of the airmail received from an entity; a recordal station 30, either as part of or separate from the weigh in station, for recording the total number of containers of airmail and for identifying by a job number or other means the airmail received into the system; an affixing station 35, located downstream of the weigh in and recordal stations, for affixing indicia on each piece of airmail, and a mail sorting station 40, located downstream of the affixing station, for sorting the airmail by country. The system 10 also includes a weighing and processing station 50 located downstream of the sorting station, a shipment or weigh out station 60, located downstream of the weighing and processing station, for weighing the processed airmail prior to shipment, and a processing unit 70 operatively connected to the weigh in and recordal stations, the weighing and processing station and the weigh out station. The processing unit 70 is also operatively connected to a printer 75 to generate reports based on the information obtained by the system and stored in the memory of the central processing unit.

The weighing and processing station 50 in conjunction with the processing unit 70 establishes a control weight per piece per country for identical airmail to a country. In addition, the weighing and processing station 50 in conjunction with the processing unit 70 determines the total number of pieces per country.

The system 10 may include a receiving station for receiving the incoming airmail that would be located upstream of the weighing station 20.

Each station of the system 10 is operatively connected to the adjacent stations in order to expeditiously move the mail from one station to the next station. This operative connection can be any conventional means of moving airmail from one station to another station, such as, for example, a conveyor belt 80.

The weigh in station 20 weighs the total international airmail received from a source or entity, such as, for example, a client or customer or a cost center in a company or association. The preferred weigh in station 20 includes a scale 25. The scale 25 is any conventional scale that can register large weights. The scale 25, and therefore the weigh in station 20, is operatively connected by conventional electrical wiring 90 to a memory in a processing unit 70 that stores the weight recorded by the scale. This electrical connection is preferably a direct electrical connection. Specifically, when the airmail is placed on the scale, the recorded weight is automatically stored in the memory of the processing unit.

The recordal station 30 is preferably positioned downstream of the weigh in station 20 and is operatively connected to forward the airmail to the weigh in station. It is anticipated, however, that the recordal station 30 can be the first station, i.e. located upstream of the weigh in station 20. In the most preferred embodiment, the weigh in and recordal stations are a single station.

The recordal station 30 is where the number of total containers of airmail received from the source, such as a client, customer or a division or cost center in a company, is recorded into the memory of the processing unit 70. The recordal station 30 preferably includes a conventional keyboard that is connected by electrical wiring 95 to the processing unit 70 so that the total number or piece count is manually inputted by the keyboard into the memory. Alternatively, the total number or piece count can be scanned into the memory by a conventional scanner, however this would require that each piece pass the scanner which is an unnecessary use of time.

The recordal station 30 is also the proper position to assign identification information, such as, a work number or job number or to the assignment. In addition, other identification information, such as the client's name, billing address and the like, can be inputted into the memory of the processing unit 70.

Figure 2:
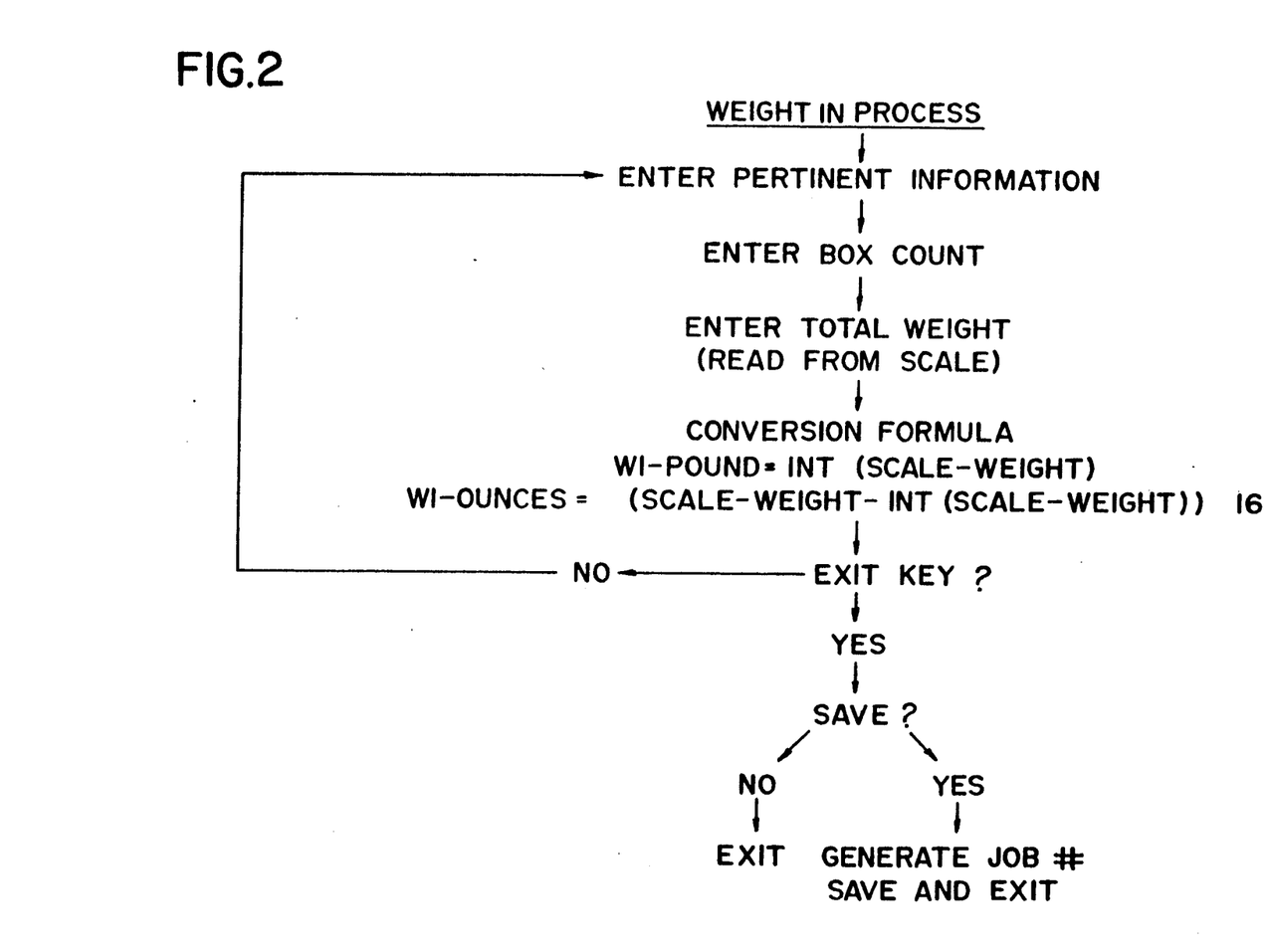
FIG. 2 is a logic diagram of the weigh in routine for the system of FIG. 1.

FIG. 2 illustrates in logic diagram the processing routine or sequence stored in the memory of the processing unit 70 that is used in conjunction with the weigh in and recordal stations 20, 30. As shown in the diagram, the pertinent information and the box or unit count is entered by the recordal station 30, while the total weight is derived from the scale 25 in the weigh in station 20. The conversion formula set forth in FIG. 2 is located in the memory of the processing unit 70.

The affixing station 35 is located downstream of the weigh in station 20 and the recordal station 30. In the preferred embodiment, the affixing station 35 is located immediately downstream the recordal station 30. The affixing station 35 affixes indicia including meter markings to each piece of airmail. The indicia is affixed by conventional means, such as, for example, a stamp or a meter. The indicia that is affixed indicates the postage paid out of a postage account recorded with the United States Postal Service. Basically, it has the postage account or meter number or the amount of postage.

The sorting station 40 is located downstream of the affixing station 35 and is operatively connected thereto, as stated above, to physically move the airmail.

At the sorting station 40, the airmail is separated or sorted by country. This task is presently performed manually, however it is a anticipated that this task will be, in the future, performed by machine. For example, the airmail is received with an address label thereon that provides the information as to the country destination. It is believed that some bar code on the address label can be placed that will respond to a scanner and thereby indicate the pile or bundle where the airmail should be directed.

Positioned downstream of the sorting station 40 and connected thereto for by the conveyor 80 in order to forward the airmail is the weighing and processing station 50. The weighing and processing station 50 besides being operatively connected to the sorting station 40 for the physical movement of the airmail, is also operatively connected by conventional electrical wiring 95 to the processing unit 70. The processing unit 70 may, in fact, be located at this station or, alternatively, it can be located at a remote location with a keyboard or the like provided at this station to input information into the processing unit. The weighing and processing station 50, serves several functions, and includes a weighing means, such as a conventional scale 55, to weigh all of the airmail placed thereon and to record the weight in the processing unit 70. The scale of the weighing and processing station 50 could be the same scale used in the weigh in station 20. It is preferred, however, that a second separate scale be used in this station 50. The scale 55 is electrically connected to the processing unit 7 by electrical wiring 90. In a preferred embodiment, the scale 55 is directly electrically connected to the processing unit 70.

The weighing and processing station 50 establishes a control weight per piece for all identical airmail in a country. This control weight is established through the use of the weighing means and a processing routine in the processing unit 70 that incorporates the information previously stored in the processing unit.

To establish the control weight, one determines whether there are a number of packages or letters per country, as received from the sorting means 40, that are identical in size and weight. To be considered identical in weight, the tolerance or differences in the weight of two packages or letters is less than 1/100 of an ounce.

If several packages or letters are identical, the average weight per piece, or control weight, is obtained in the following manner. Place a number of identical pieces, preferably, ten since this number is both a convenient number to count and is the standard used by the United States Postal Service, on the scale 55. The weight is automatically recorded in the memory of the processing unit 70. Then, the number of pieces placed on the scale is inputted into the processing unit 70 by the keyboard connected to the processing unit. Again, the number of pieces could, alternatively, be inputted by a scanner, however this is more time consuming and, therefore, costly.

Figure 3A:
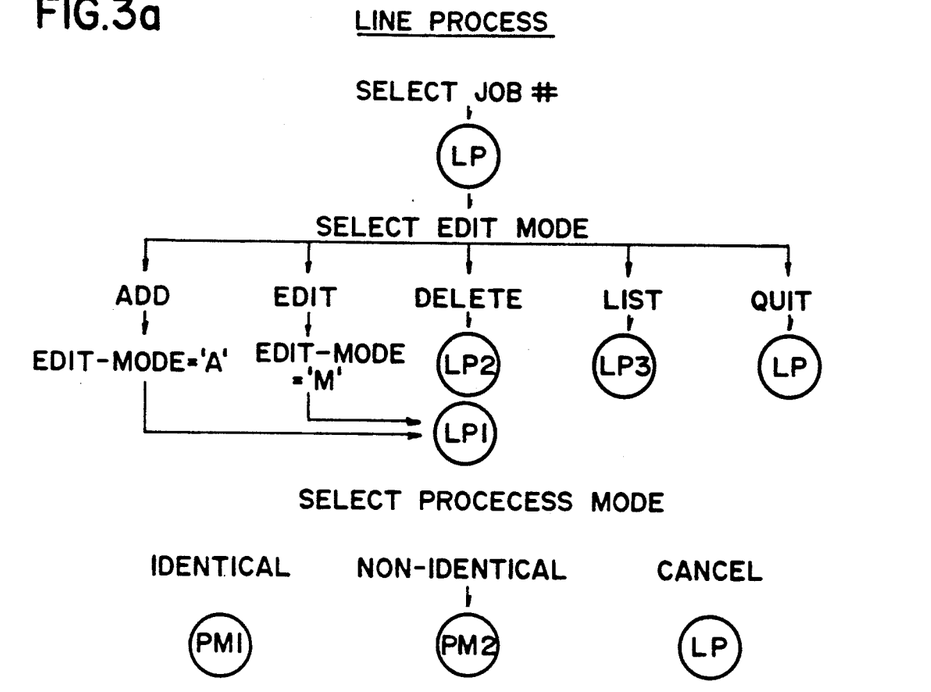
FIGS. 3a-3d, 3d' are logic diagrams of the weighing and process routine for the system of FIG. 1.
Figure 3B:
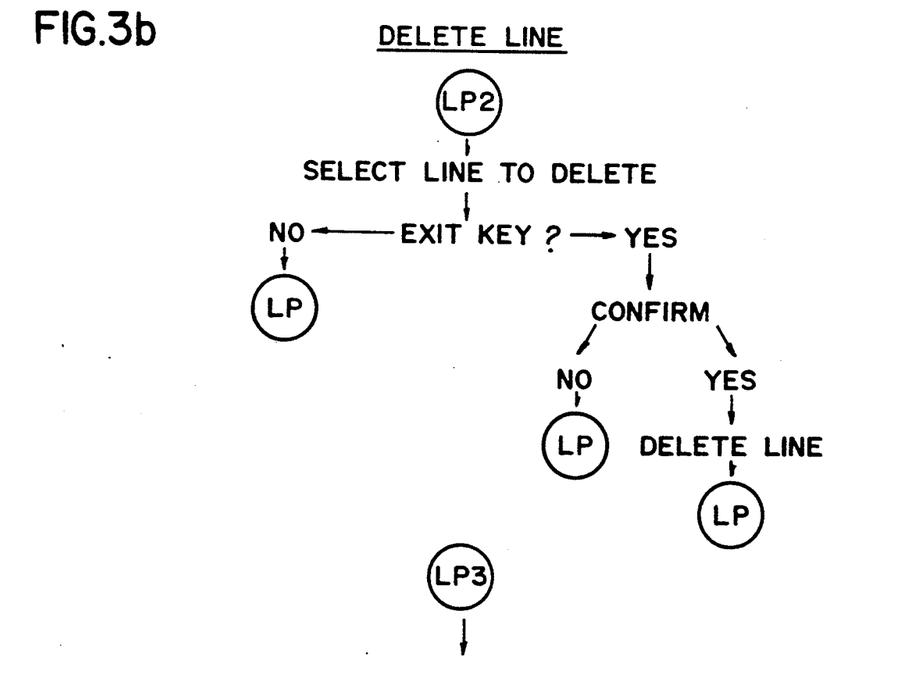

Thus, for identical pieces, the input of the number of pieces into the processing unit 70 and the automatic recordal of the weight on the scale 55 and the storing of the recorded weight in the processing unit are variables that in connection with the routine set forth in FIG. 3b (in conjunction with FIG. 3a), in the processing unit, provides the average weight per piece per country for all identical pieces. Once this is achieved, the entire bundle of identical mail can be placed on the scale and the routine in the processing unit 70 will automatically record and store the entire weight. The routine in the processing unit 70 will calculate the average weight per piece, and will determine the number of pieces in the bundle.

The entire routine for identical pieces of airmail is illustrated in FIG. 3b in conjunction with FIG. 3a. The entire routine for the weighing and processing station in conjunction with the processing unit 70 includes FIGS. 3a and 3b, along with FIG. 3c which is the routine for nonidentical pieces and FIG. 3d which is the routine for country by country entry of information.

For nonidentical pieces, each piece has to be inputted separately. The present system 10 will still expedite this since the scale automatically weighs the piece and the recorded weight is automatically inputted into the processing unit 70. In addition, the inputted information and the recorded information are immediately stored in the memory of the processing unit 70 and available for immediate processing by the routine, shown in FIG. 3c, in the processing unit.

The routine of FIGS. 3a-3d, 3d' can be simply stated as follows. The initial screen or screens and corresponding information storage in the memory of the processing unit 70 should provide a job number selection screen and instructions whether the pieces or units are to be classified as identical or nonidentical.

If the identical routine feature is selected, the unit size and the number of pieces are inputted either by a scanner or, at present, manually. The scale has automatically forwarded the recorded weight so that the routine then automatically calculates by country the number of pieces. The printed report is divided by zones and within each zone is divided into countries in that zone. For each country, the report prints for each line: a unique country code, the country that is represented by the country code, the number of pieces or units of mail for that country which number has been derived by the mathematical calculations based on the calculated control weight and the measured (by the scale) total weight of mail for the country, and the total weight of the mail for that country.

Figure 3C:
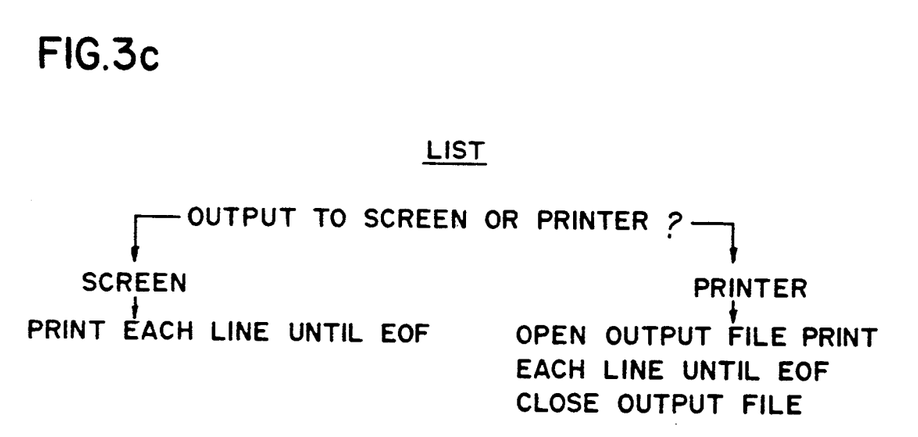
Figure 3D:
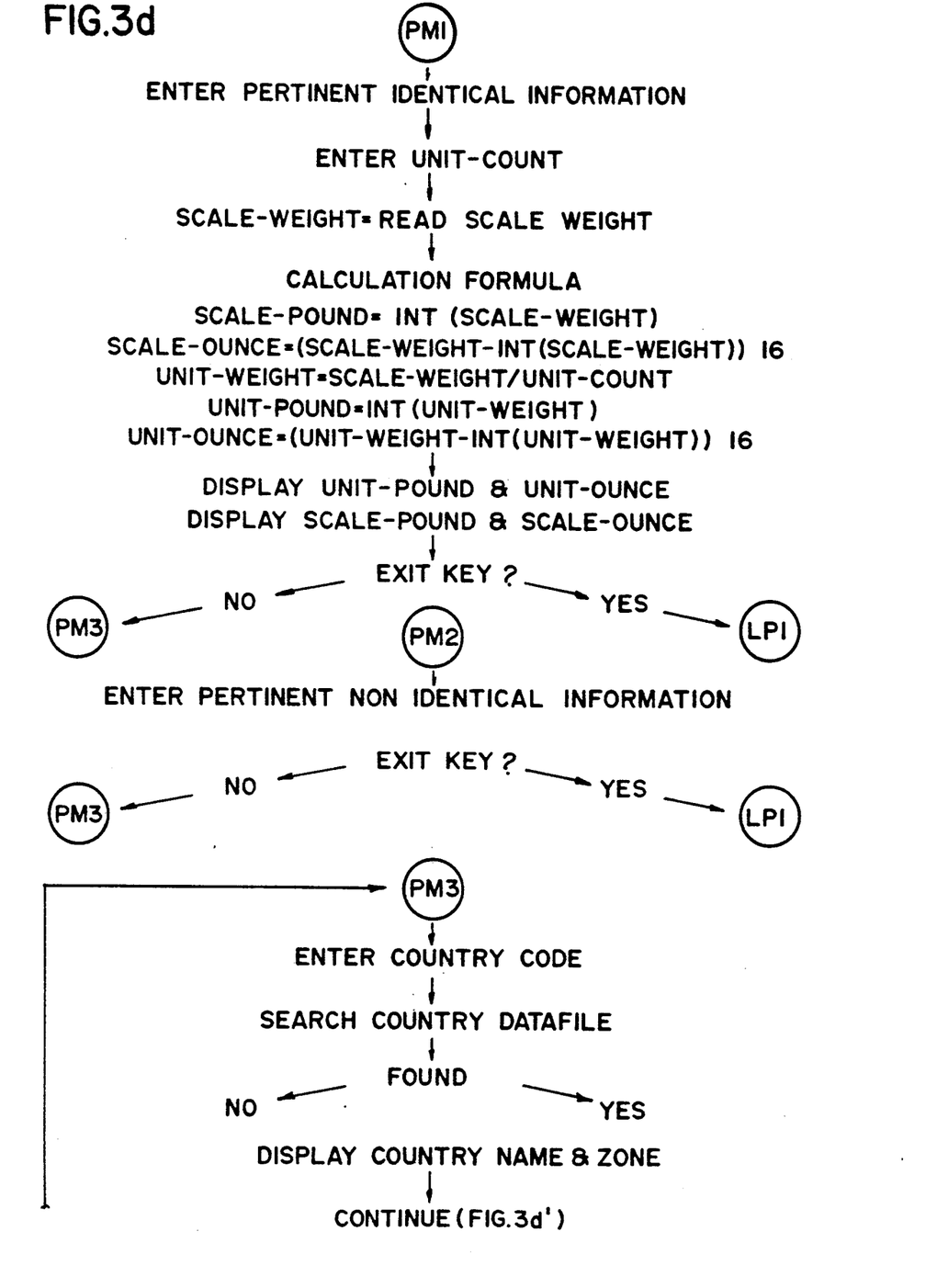

If the nonidentical routine is selected, the unit size of the piece of mail must be entered or inputted into either by scanner or, at present, manually into the work station and, therefore, the central processing unit 70. The scale automatically weighs the piece of mail. The information for this nonidentical mail is commingled with the identical mail and is included in the print report set forth above.

Figure 4:
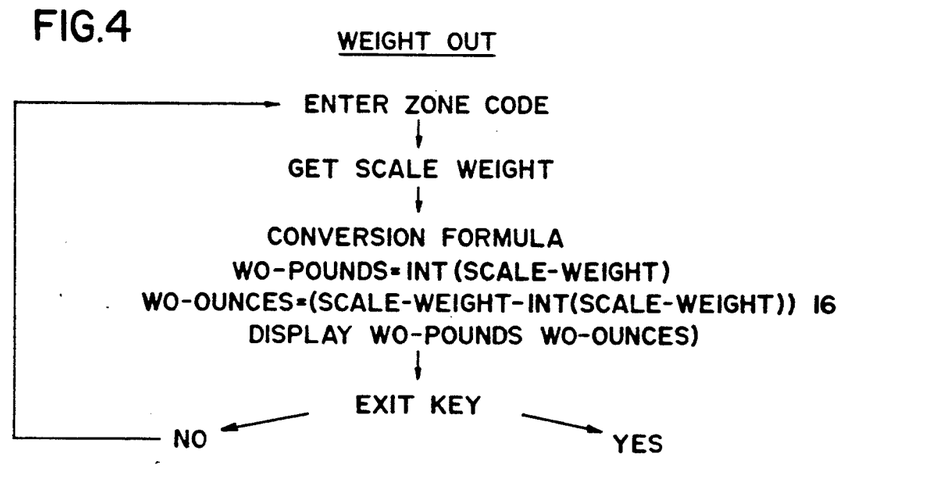
FIG. 4 is a logic diagram of the weigh out routine for the system of FIG. 1.

The processing unit 70 has a memory that stores inputted information, as well as the logic or processing routines of the present invention. In particular, the processing unit 70 stores the logic routine or process shown in FIG. 2 for the weigh in station 20, the logic process, as shown in FIGS. 3a-3d, for the weighing and processing station 50, the logic process for the weigh out station 60 shown in FIG. 4. In addition, the processing unit 70 stores the logic process or routine shown in FIGS. 5 and 6 to print out the closing report and the billing report, and the maintenance routines shown in FIGS. 7a-7c. In short, the processing unit 70 includes in its memory the following processes or routines: the weigh in process, the line or weighing and processing process, the weigh out process, the closing report routine, the billing report routine and the department maintenance, postal maintenance and country list maintenance routines.

The processing unit 70 is connected by conventional means such as electric wiring to a printer. The processing unit 70, which can be a computer, has conventional programming to instruct the printer 75 to generate a report based on information stored in the processing unit. In the present system, the memory of the processing unit 70 can store the desired information, such as the country code that has been developed to unambiguously identify by code each country of the world, except Canada and the United States, the allocation of each country to one of the three established international zones, each country name, and international zone rate postage information, namely piece and pound rates per zone. In addition, the memory of the processing unit 70 has the ability to receive and change the pricing structure for client billing and department categories, as desired.

The report generated by the processing unit 70 in conjunction with the stations of the present system, especially the weighing and processing station 50, includes a breakdown portion of the report and a summary portion of the report. The breakdown portion of the report is separated into three sections each referencing a different international zone. Within each zone, the breakdown includes a country code, country name, number of units o pieces and the weight for the number of units.

The print report routine, in addition, provides a summary report that includes a breakdown into four categories, namely the nonpresort airmail and the three presort groups of priority airmail. In each category, the number of units or pieces is set forth, the fixed price per piece and the total cost on a per piece basis that has been mathematically calculated. Also, the total number of pounds, the fixed price per pound and the total cost on a per pound basis that has been mathematically calculated. The summary report also summarizes the total pieces in all categories, the total piece rate postage, the total pounds, the total pounds rate postage, the total price and pounds rate postage and identifies countries that have failed to meet presort criteria.

As stated above, at or immediately after the weighing and processing station 50, a printer 75 connected to the processing unit 70 prints out the report. Alternatively, the printer could be at a remote location or connected to the processing unit 70 that, preferably, is located at a remote location. By remote location, it is meant a location that does not interfere with the production process of physically moving the airmail from station to station.

In any event, the report is, preferably, printed out at this time. The summary portion of the report can be compared to the information initially inputted into the memory of the central processing unit, namely the total weight of the received airmail and the total number of pieces of received airmail. This is a check mechanism to verify that all received airmail has been accounted for.

The report should follow the airmail as it is forwarded to the weigh out or shipment station 60. At the weigh out station 60, the airmail for each country can be weighed again with a third scale 65 that is also operatively connected to the processing unit 70. The measured weight is automatically or simultaneously stored in the memory of the processing unit 70. By the conversion formula, shown in FIG. 4 that is the logic for the weigh out station 60 stored in the processing unit 70, and the number of pieces per country can be checked and compared to the report. This serves as a second check of the accuracy of the information provided in the report.

The present system 10 may include a initial receiving station for receiving the incoming airmail. This receiving station can be an conventional mail receiving station that permits for the handling of the received airmail.

Figure 5:
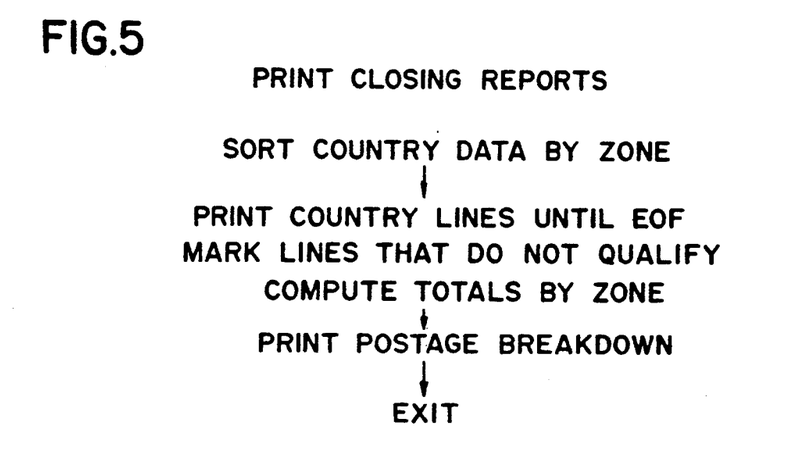
FIG. 5 is a logic diagram of the routine for printing a closing report from the system of FIG. 1.
Figure 6:
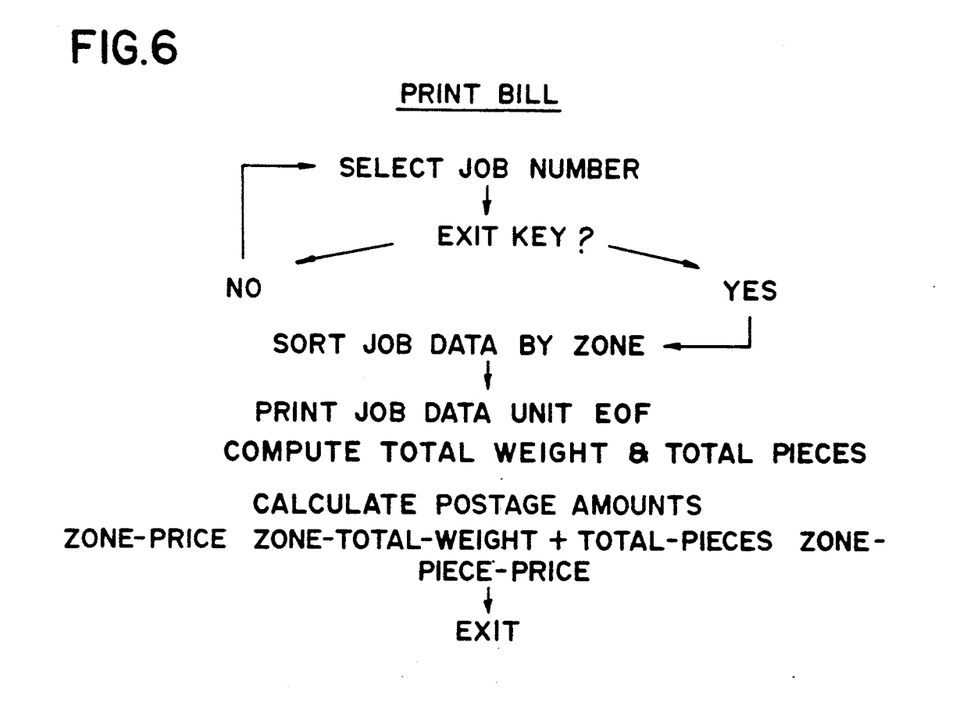
FIG. 6 is a logic diagram of the routine for printing a bill from the system of FIG. 1.
Figure 7A:
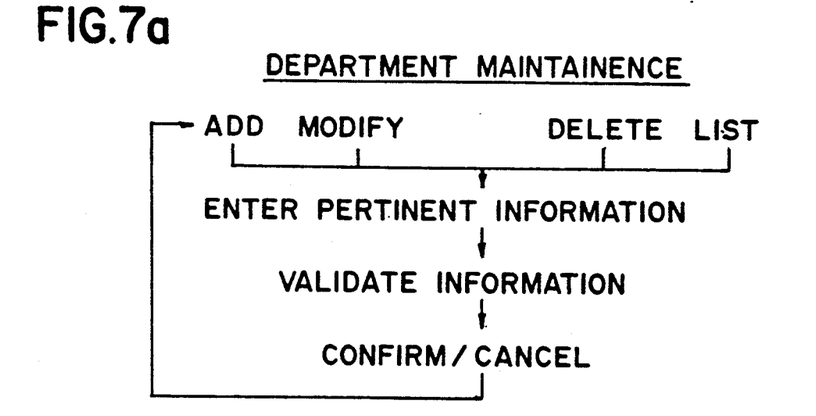
FIGS. 7a-7c are the logic diagrams for the department, postal rate and country list maintenance routines for the system of FIG. 1.
Figure 7B:
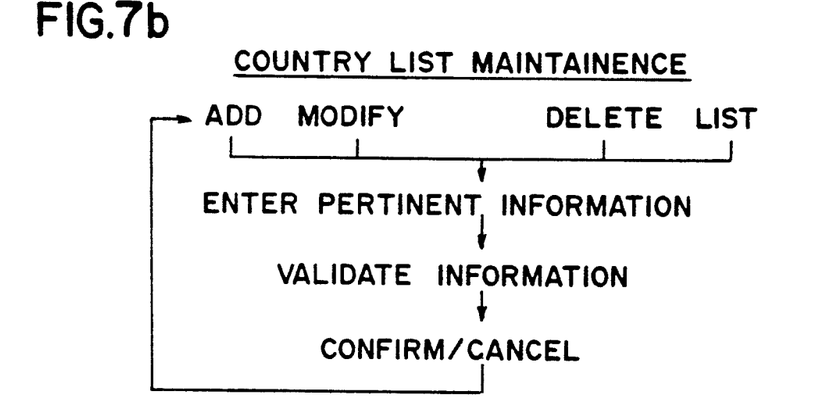
Figure 7C:
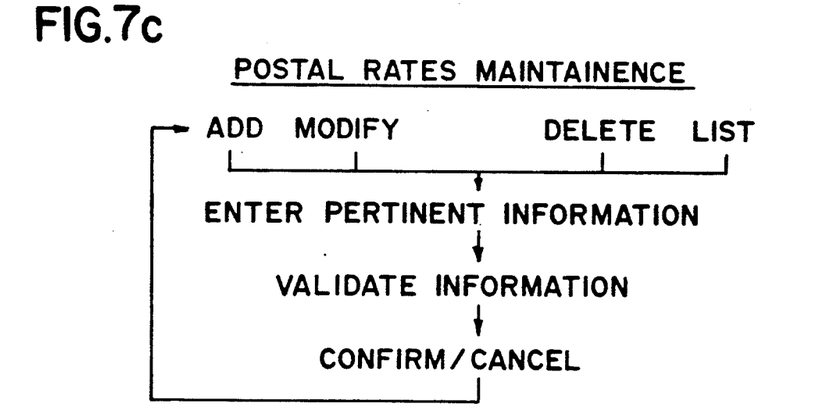

The routine for printing the report is illustrated in FIG. 5. If the report is to be modified to generate a second or different report that is to be included in the billing of services for processing the airmail, the logic routine or process shown in FIG. 6 is used.

Accordingly, the present system 10 provides (a) recordal of vital information need to comply with United States Postal Service regulations concerning international priority airmail, (b) processing of the airmail itself, and (c) reports beneficial to the billing of cost centers or clients.

The present invention may, of course, be carried out in other specific ways than those set forth herein without departing from the spirit and essential characteristics of the present invention. The present embodiments are, therefore, to be considered in all respects as illustrative and not restrictive, and to provide for all changes coming within the meaning and equivalency range the appended claims are intended to embrace.

Wherefore I claim:

1. A system for processing a number of pieces of international priority airmail comprising:
    a weigh in station for weighing the number of pieces of airmail to obtain a total weight of the number of pieces of airmail;
    a recordal station for recording the number of pieces of airmail and for establishing identification criteria for the airmail in the system;
    means for moving the number of pieces of airmail between the weight in station and the recordal station;
    an affixing station, located downstream of the weight in station and recordal stations, for affixing indicia onto the number of pieces of airmail;
    a sorting station, located downstream of the affixing station, for sorting the number of pieces of airmail by country;
    a processing unit operatively connected to the weigh in station and the recordal station for receiving information therefrom, the processing unit including means for storing received information and means for processing stored information to derive processed information; and
    a weighing and processing station, located downstream of the sorting station, and being operatively connected to the processing unit to weigh the number of pieces of airmail and to record the piece number information after the number of pieces of airmail have been sorted, wherein the weighing and processing station in conjunction with the processing unit determines the total number of pieces per country; and
    means for generating a report based on the processed information from the processing unit.

2. The system according to claim 1, further comprising a receiving station for receiving the airmail into the system.

3. The system according to claim 1, further comprising a weigh out station located downstream of the weighing and processing station for weighing the processed airmail.

4. The system according to claim 1, wherein the weighing and processing station includes a scale that is operatively connected to the processing unit to immediately record the weight of the airmail placed on the scale.

5. The system according to claim 1, wherein the processing unit includes a processing routine that calculates the number of pieces per country based on a total weight by country derived at the weighing and processing station and a control weight calculated based on selectively weighed pieces and information concerning the number of pieces inputted directly into the processing unit.

6. The system according to claim 1, wherein the weigh in station includes a scale.

7. The system according to claim 1, wherein the weighing and processing station includes a scale that is operatively connected to the processing unit.

8. A method for processing a number of pieces of international priority airmail, the method comprising the steps:
    weighing the number of pieces of airmail to obtain a total weight of the number of pieces of airmail;
    recording the total number of pieces of airmail and establishing identification criteria for the airmail in the system;
    moving the number of pieces of airmail from the weigh in station to the recordal station;
    affixing indicia onto the number of pieces of a airmail after the airmail has been weight and recorded;
    sorting the number of pieces of airmail by country after the indicia has been affixed thereon;
    weighing the number of pieces of airmail and recording piece number information after the number of pieces of airmail have been sorted; and
    processing the total weight information, the total piece number information, and the information concerning the weight and piece number information after the number of pieces have been sorted to derive processed information that established a control weight per piece per country for identical pieces sent to each country and determines the total number of pieces per country; and
    generating a report based on the processed information.

9. The system according to claim 1, wherein the processing unit in conjunction with the weigh in station and the recordal station establishes a control weight per unit per country for identical pieces of airmail to be sent to each country.

10. The system according to claim 9, wherein the control weight is derived by weighing a desired number of identical pieces and simultaneously recording the weight in the processing unit, entering the number of units weighed into the processing unit, and calculating the average weight per unit per country for all identical pieces using a program routine in the processing unit.

11. The system according to claim 1, wherein the processing unit is a computer having a keyboard.

12. The system according to claim 1, wherein the means for generating a report is a printer connected to the processing unit.

13. The system according to claim 8, wherein the report includes a breakdown portion and a summary portion.

14. The system according to claim 13, wherein the breakdown portion of the report is separated into three sections each referencing a different international zone.

15. The system according to claim 14, wherein each section includes country codes, country names, number of pieces per country and the weight for the total number of pieces per country.

16. The system according to claim 13, wherein the summary portion of the report includes a breakdown into four categories.

17. The system according to claim 16, wherein the four categories are nonpresort airmail and three presort groups of airmail.

18. The system according to claim 17, wherein each of the four categories includes the number of pieces, the fixed price per piece, the total cost on a per piece basis that has been derived by the processing unit, the total number of pounds, the fixed price per pound, and the total cost on a per pound basis that has also been derived by the processing unit.

19. The system according to claim 18, wherein each of the four categories also summarizes the total pieces in all four categories, the total piece rate postage, the total pounds, the total pounds rate postage and the total price and pounds rate postage.

* * * * *